119,830

UNITED STATES PATENT OFFICE.

CHARLES G. DODGE, OF MARSHALL, MICHIGAN.

IMPROVEMENT IN COMPOSITIONS FOR REMOVING INCRUSTATIONS IN STEAM-BOILERS.

Specification forming part of Letters Patent No. 119,830, dated October 10, 1871.

*To all whom it may concern:*

Be it known that I, CHARLES G. DODGE, of Marshall, in the county of Calhoun and State of Michigan, have invented a certain Improved Compound for Removing Incrustations from Steam-Boilers, and also for preventing the formation of the said incrustations, of which the following is a specification:

My invention relates to the combination of certain ingredients, which after pulverization are well mixed and combined together, and a suitable quantity introduced into the boiler for the purpose of softening and disintegrating the hard calcareous scale adhering to the metal of neglected boilers, arising from impure water, and so that such scale, together with the sediment, may be blown out under pressure or removed in any other suitable way.

My improved compound is prepared of the following ingredients and in substantially the proportions named: In one hundred pounds of the compound there are seventy pounds of the best soda-ash; five pounds of sal ammoniac; ten pounds of wood charcoal; ten pounds of finely-ground white-oak bark, or an equivalent quantity of catechu or other extract containing tannin; and five pounds of the bran of any farinaceous grain. All of these ingredients should be finely pulverized (the charcoal more especially) and mixed and commingled intimately together, and certain portions introduced into a steam-boiler either through the feed-pump or other openings in the boiler.

In boilers of the large flue or cylinder kind, where heavy scale is deposited, I usually introduce the compound at the rate of one-third of a pound for every twelve square feet of effective heating surface, to be repeated every two or three days, blowing off partially or wholly during the intervals, until the scale is entirely separated and disintegrated; when, after a final blowing off, the boiler may be washed out clean, and afterward the compound may be introduced at the rate of one-eighth of a pound per horse-power capacity every two weeks, which will entirely prevent the formation of scale.

Tubular and other boilers working under different conditions will necessarily require a somewhat modified treatment, as a little experience may dictate, for it is impossible to apply rules of an arbitrary character.

The charcoal in my compound neutralizes the combined effect of the alkalies and acids by absorbing the liberated gases, and thereby prevents the injurious foaming produced by analogous compounds, while the gluten and silex of the bran coats the newly-exposed surface of the iron, stops leaks, and prevents oxidation.

I claim as my invention—

The compound for the removal and prevention of steam-boiler incrustations, composed of the ingredients, in the proportions, and applied substantially as set forth.

CHARLES G. DODGE.

Witnesses:
CHARLES ROOT,
W. C. WHITE.

(148)